(No Model.)

R. HOLMES.
CHAFFER FOR THRASHING MACHINES.

No. 549,918. Patented Nov. 19, 1895.

WITNESSES
Helen Graham
William S. Graham

INVENTOR
Robert Holmes
by his attorney
L. P. Graham

UNITED STATES PATENT OFFICE.

ROBERT HOLMES, OF DANVILLE, ILLINOIS.

CHAFFER FOR THRASHING-MACHINES.

SPECIFICATION forming part of Letters Patent No. 549,918, dated November 19, 1895.

Application filed March 30, 1895. Serial No. 543,786. (No model.)

*To all whom it may concern:*

Be it known that I, ROBERT HOLMES, of Danville, in the county of Vermilion and State of Illinois, have invented certain new and useful Improvements in Chaffers for Thrashing-Machines, of which the following is a specification.

In thrashing wheat it is desirable to use a perforated chaffer. A slatted chaffer with large spaces between the slats is better for oats, and barley requires a condition between that of wheat and oats.

This invention is designed to provide a chaffer that may be adjusted to meet the requirements of different kinds and conditions of grain. It is exemplified in the structure hereinafter described, and it is defined in the appended claim.

Figure 1:
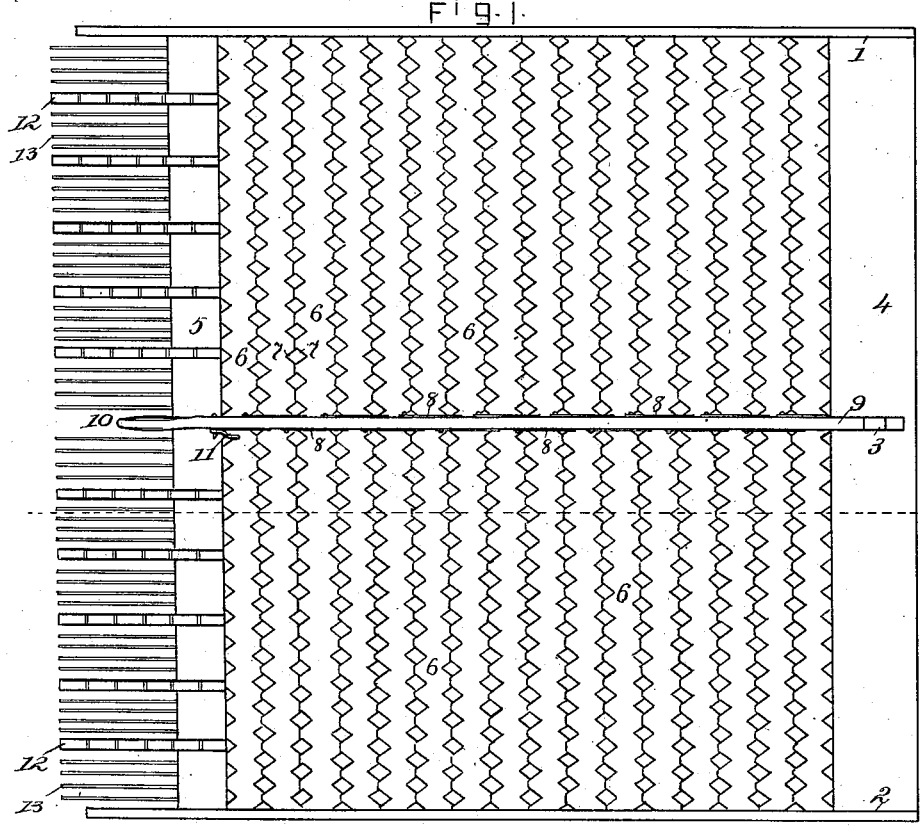
Figure 2:
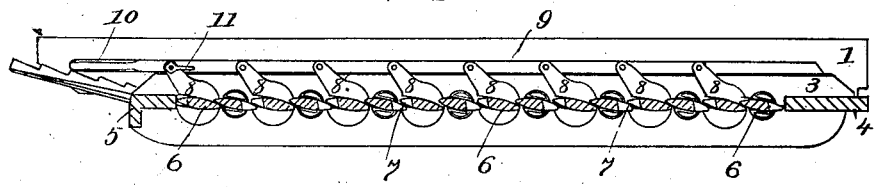
Figure 3:
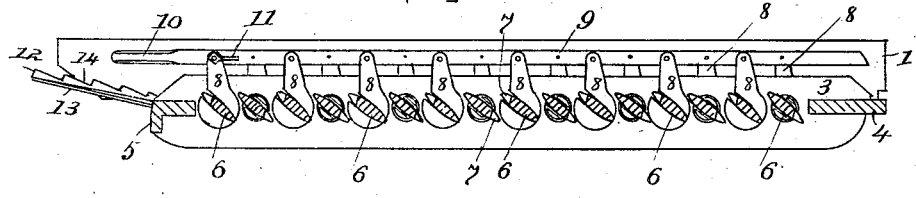

In the drawings forming part of this specification, Figure 1 is a plan of a chaffer constructed in accordance with my invention. Fig. 2 is vertical section on line X in Fig. 1, showing the chaffer in condition to clean wheat. Fig. 3 is a similar section on the same line, showing the slats arranged to clean oats.

The chaffer consists of a frame and a set of parallel transverse slats pivoted in bearings in the frame and notched in their edges in such manner that the notches of each edge of each slat coincide with the notches of the adjoining edge of the slat next adjacent. The slats are of a width to cover the bottom of the chaffer when spread out or disposed horizontally, and they are so pivoted in the frame that the rear upper edge of each will slightly overlap or at least reach the front edge of the next in the rear when they are as nearly horizontal as their construction and arrangement will permit, and under these conditions the notches combine to form what is in effect a perforated riddle. The frame in this particular instance is composed of side pieces 1 and 2, center piece 3, and end pieces 4 and 5. The slats 6 are journaled at their ends in holes made in the end pieces and at their centers in holes in the center piece. Their edges are notched, as shown at 7, so that the notches of each edge coincide with the notches of the adjoining edge of the slat next adjacent, and the notches of one edge of each slat preferably coincide or line up with spaces between notches of the opposite edge of the same slat. In other words, the notches on one side of a slat alternate with those on the other side of the same slat, counting from end to end of the slat. Each slat has an arm 8, that connects pivotally with a shifting-bar 9, which is supplied with a handle 10, that projects over the tail of the chaffer in an accessible position. One of the arms 8, preferably the rear one, is attached to the shifting-bar by a threaded bolt, and a finger-nut 11 provides means for clamping the arm against the bar and holding the bar, the arms, and the slats in any desired position. The tail of the chaffer is preferably supplied with rearwardly-extended parallel rods 13, with which are interspersed push-bars 12, having teeth 14.

The chaffer is swung in the tail of a thrasher above an air-blast and is vibrated in the manner common to such and analogous devices. When the slats are set as shown in Fig. 2, the result is to produce a perforated riddle differing from an ordinary riddle in the irregular upper surface, which tends to carry the chaff, &c., more rapidly toward the tail when the chaffer is vibrated. When the slats are set as shown in Fig. 3, the air will pass through the openings between slats and keep the chaff floating along toward the tail, while the grain will have increased facilities for passing through the chaffer. The extreme positions shown are adapted one for wheat and the other for oats. Intermediate positions of the slats may be advantageous for cleaning other grain, as barley, and for treating various conditions of different kinds of grain, and it is an easy matter to get whatever adjustment is required.

The size and form of the notches may be varied to suit different circumstances, as may also the construction and proportion of the different elements of the device.

Having thus described my invention, I claim as new and desire to secure by Letters Patent—

A chaffer comprising a longitudinally reciprocating frame, and a set of transverse slats with notched edges pivoted in the frame in a manner to form a perforated surface when the slats are closed together, substantially as set forth.

In testimony whereof I sign my name in the presence of two subscribing witnesses.

ROBERT HOLMES.

Attest:
WM. A. MARBLE,
HARRY O. LUFT.